(12) United States Patent  
Taketani

(10) Patent No.: US 11,061,237 B2  
(45) Date of Patent: Jul. 13, 2021

(54) DISPLAY APPARATUS

(71) Applicant: CANON KABUSHIKI KAISHA, Tokyo (JP)

(72) Inventor: Akihito Taketani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/246,184

(22) Filed: Jan. 11, 2019

(65) Prior Publication Data

US 2019/0219826 A1    Jul. 18, 2019

(30) Foreign Application Priority Data

Jan. 18, 2018  (JP) ............................. JP2018-006487

(51) Int. Cl.
*G02B 27/01* (2006.01)
*G02B 27/02* (2006.01)
*G02B 13/00* (2006.01)

(52) U.S. Cl.
CPC ....... *G02B 27/0172* (2013.01); *G02B 27/027* (2013.01); *G02B 13/009* (2013.01); *G02B 2027/0123* (2013.01); *G02B 2027/0134* (2013.01); *G02B 2027/0138* (2013.01); *G02B 2027/0147* (2013.01)

(58) Field of Classification Search
CPC .............. G02B 27/0172; G02B 27/027; G02B 2027/0123
See application file for complete search history.

(56) References Cited

U.S. PATENT DOCUMENTS

| | | | | |
|---|---|---|---|---|
| 5,886,822 A | * | 3/1999 | Spitzer | G02B 27/0172 |
| | | | | 359/630 |
| 6,204,974 B1 | * | 3/2001 | Spitzer | G02B 27/017 |
| | | | | 359/630 |
| 6,625,299 B1 | * | 9/2003 | Meisner | G01S 5/16 |
| | | | | 348/169 |
| 8,670,000 B2 | * | 3/2014 | Braun | G09G 3/002 |
| | | | | 345/617 |
| 9,069,382 B1 | * | 6/2015 | Starner | G06F 3/033 |
| 9,401,050 B2 | * | 7/2016 | Cajigas | G09G 5/00 |
| 9,824,499 B2 | * | 11/2017 | Wright | G06T 19/006 |
| 9,851,803 B2 | * | 12/2017 | Fisher | G02B 27/0172 |
| 10,178,378 B2 | * | 1/2019 | Travis | H04N 13/383 |
| 10,180,734 B2 | * | 1/2019 | Miller | G06F 3/0346 |
| 2006/0192306 A1 | * | 8/2006 | Giller | B29C 39/006 |
| | | | | 264/1.7 |

(Continued)

FOREIGN PATENT DOCUMENTS

JP       5311440 B2    10/2013

*Primary Examiner* — Nitin Patel
*Assistant Examiner* — Robert M Stone
(74) *Attorney, Agent, or Firm* — Canon U.S.A., Inc. IP Division

(57) ABSTRACT

A display apparatus including a left portion corresponding to a left eye of a user and a right portion corresponding to a right eye of the user, each portion includes at least one image capturing unit configured to capture an image of a physical space, and a display unit configured to display a video image based on a captured image obtained by the image capturing unit. The image capturing unit is arranged on an inside of an angle formed by lines extending from the pupil of the corresponding eye to each side of the display unit.

16 Claims, 9 Drawing Sheets

(56) References Cited

U.S. PATENT DOCUMENTS

| | | | | |
|---|---|---|---|---|
| 2007/0285338 | A1* | 12/2007 | Yanagisawa | H04N 5/23293 345/1.1 |
| 2008/0077953 | A1* | 3/2008 | Fernandez | H04N 7/15 725/32 |
| 2010/0056274 | A1* | 3/2010 | Uusitalo | G02B 27/017 463/31 |
| 2011/0043644 | A1* | 2/2011 | Munger | H04N 13/346 348/207.1 |
| 2011/0234476 | A1* | 9/2011 | Sugihara | G02B 27/0172 345/8 |
| 2012/0062444 | A1* | 3/2012 | Cok | G02B 27/0172 345/8 |
| 2012/0120103 | A1* | 5/2012 | Border | G02B 27/017 345/633 |
| 2013/0050070 | A1* | 2/2013 | Lewis | G02B 27/017 345/156 |
| 2014/0002442 | A1* | 1/2014 | Lamb | G06F 3/1431 345/419 |
| 2014/0333666 | A1* | 11/2014 | Poulos | G06F 3/147 345/633 |
| 2015/0178939 | A1* | 6/2015 | Bradski | G06T 19/006 345/633 |
| 2016/0012643 | A1* | 1/2016 | Kezele | G02B 27/0093 345/633 |
| 2016/0026253 | A1* | 1/2016 | Bradski | H04N 13/344 345/8 |
| 2016/0091720 | A1* | 3/2016 | Stafford | G02B 27/0093 345/8 |
| 2016/0261840 | A1* | 9/2016 | Nakashima | G02B 27/017 |
| 2016/0270648 | A1* | 9/2016 | Freeman | A61B 3/0025 |
| 2016/0299569 | A1* | 10/2016 | Fisher | G02B 27/0172 |
| 2017/0000335 | A1* | 1/2017 | Samec | G16H 40/63 |
| 2017/0185037 | A1* | 6/2017 | Lee | G02B 27/0172 |
| 2018/0246331 | A1* | 8/2018 | Cheng | G06F 1/163 |
| 2018/0249151 | A1* | 8/2018 | Freeman | G16H 20/30 |
| 2018/0350150 | A1* | 12/2018 | Powderly | G06F 1/163 |
| 2019/0060001 | A1* | 2/2019 | Kohli | A61B 90/37 |
| 2019/0130622 | A1* | 5/2019 | Hoover | G02B 27/017 |

* cited by examiner

VIDEO IMAGE ON
IMAGE CAPTURING UNIT

VIDEO IMAGE ON
DISPLAY UNIT

VIDEO IMAGE
VIEWED FROM USER

DISPLAY APPARATUS

BACKGROUND OF THE INVENTION

Field of the Invention

The present disclosure generally relates to a display apparatus.

Description of the Related Art

In recent years, a mixed reality (MR) technique and an augmented reality (AR) technique have been known as techniques for achieving real-time and seamless mixing of a physical space and a virtual space. As one of the techniques, a technique using a video see-through head-mounted display (HMD) is known. A video camera or the like captures an image of an object that approximately matches the real image of the object that would be observed from a pupil position of the wearer of the HMD. The wearer of the HMD can observe, through a display in the HMD, an image in which computer graphics (CG) are superimposed on the captured image. Herein the visual area occupied by such an image is known as the visual field, and the visual area that would be seen by if the HMD was not present is known as the real field of view.

In a case in which an image capturing unit such as a video camera is large, or if the image capturing unit is situated on the outside of the display unit, the exterior package that includes the image capturing unit becomes inevitably larger. As a result, a video image displayed on the display unit and the view of the surrounding area can be visually separated from each other.

In addition, if an eye cup or the like for shielding an area around the visual field is used to enhance a sense of immersion in a video-see-through video image, the real field of view is hidden from the user's sight. It is known that this phenomenon causes video motion sickness which is an issue inherent in the recent HMDs.

Among the HMDs, optical see-through HMDs are often configured such that an area around the visual field is open so that the real field of view is visible. Fully-virtual HMDs do not require the real field of view and thus are often configured such that the area around the visual field is shielded. On the other hand, only a small number of video see-through HMDs are configured such that the area around the visual field is open.

Japanese Patent No. 5311440 discusses a technique relating to a monocular HMD configured such that a video-see-through video image and a real field of view around a visual field can be viewed continuously for the purpose of supporting an operation performed by a user. However, in the case of using such a monocular HMD for both eyes, the arrangement of the two monocular lenses can cause vignetting in the field of view of a single eye due to the presence of the nose between the eyes.

SUMMARY OF THE INVENTION

The present disclosure is generally related to a display apparatus and more specifically is directed to providing a display apparatus that prevents an image capturing unit from shielding a user's field of view.

According to an aspect of the present disclosure, a display apparatus including a left portion corresponding to a left eye of a user and a right portion corresponding to a right eye of the user, each portion includes at least one image capturing unit configured to capture an image of a physical space, and a display unit configured to display a video image based on a captured image obtained by the image capturing unit. The image capturing unit is arranged on an inside of an angle formed by lines extending from the pupil of the corresponding eye to each side of the display unit.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The technical scope of the present disclosure is defined by the claims and is not limited by the following individual exemplary embodiments. A head-mounted display is hereinafter abbreviated as an "HMD".

Figure 1:
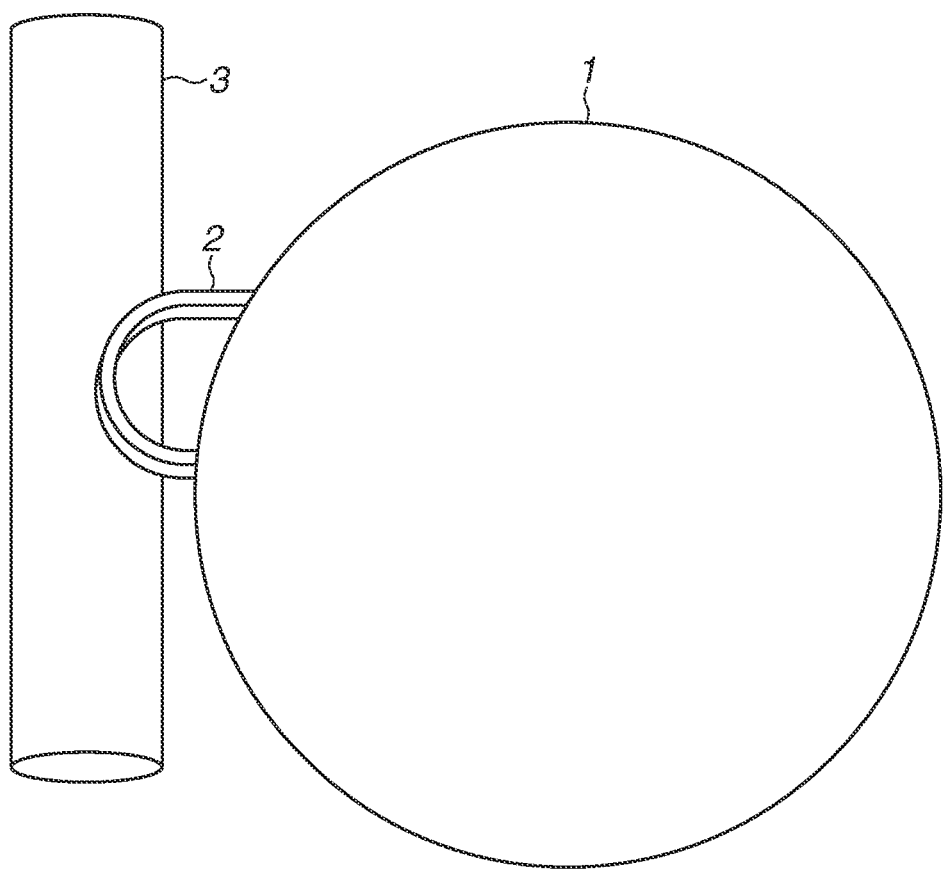
FIG. 1 illustrates an example of using a head-mounted display according to a first exemplary embodiment.

FIG. 1 illustrates a state where a user 1 wearing an HMD 2 according to a first exemplary embodiment of the present disclosure is observed from behind. The HMD 2 using a video see-through method is worn on a head of the user 1. Although FIG. 1 illustrates only the HMD 2 for the left eye of the user 1, the HMD 2 for the right eye of the user 1 is also present. The user 1 is viewing a physical object 3 which is located on the front side of the HMD 2. The physical object 3 includes a portion that is seen on the outside of a frame of the HMD 2, and a portion that is seen on the inside of the frame of the HMD 2. The portion of the physical object 3 that is seen on the outside of the frame of the HMD 2 is an optical image in the real field of view that is visible around the visual field of the user 1. The portion of the physical object 3 that is seen on the inside of the frame of the HMD 2 is a captured display video image that can be observed by the user 1 when a video image captured by a camera of the HMD 2 is displayed on a display in the HMD 2. In this case, it is important that the optical image in the circumference of the real field of view and the captured display video image in the HMD 2 can be viewed as seamless and continuous.

Figure 2:
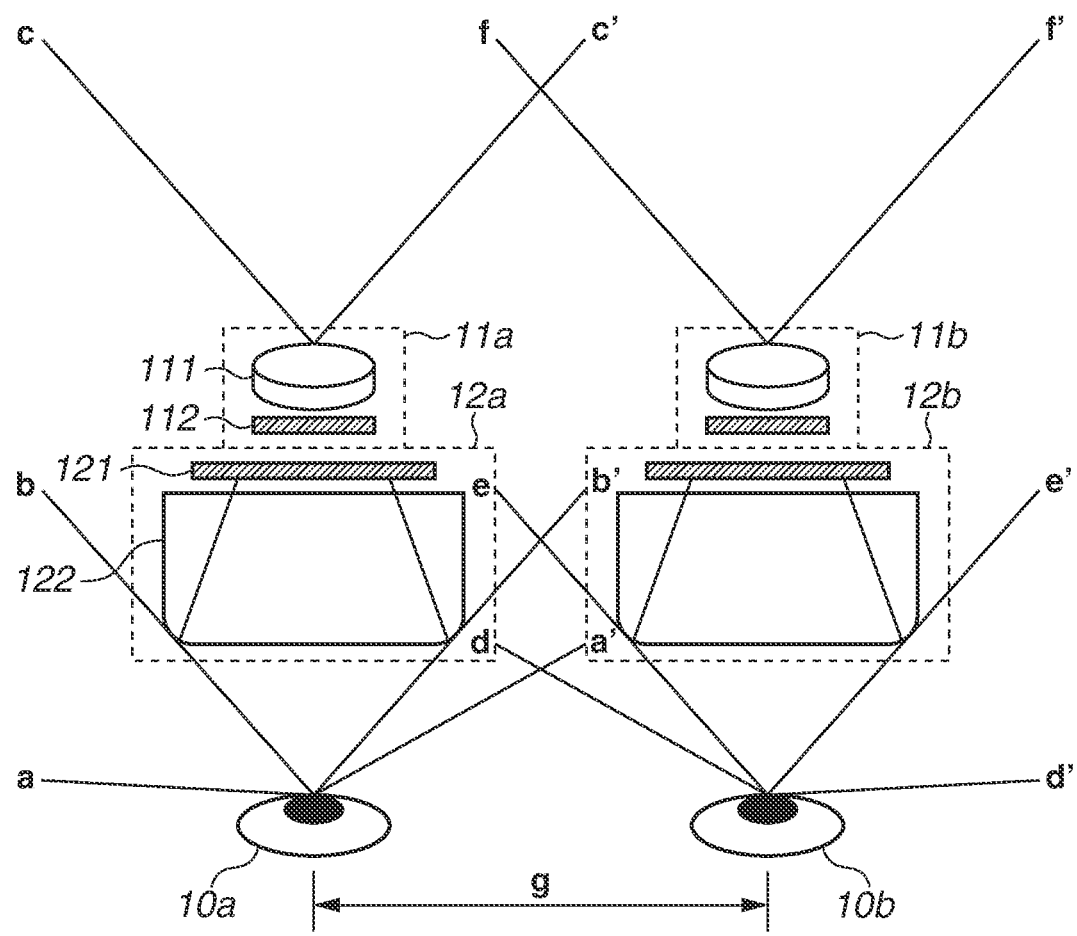
FIG. 2 illustrates a configuration example of the head-mounted display according to the first exemplary embodiment.

FIG. 2 is a schematic diagram illustrating a configuration example of the HMD 2 according to the first exemplary embodiment. An eye 10a corresponds to the left eye of the user. An eye 10b corresponds to the right eye of the user. The HMD 2 is a video see-through HMD. The HMD 2 includes an image capturing unit 11a corresponding to the left eye 10a, an image capturing unit 11b corresponding to the right eye 10b, a display unit 12a corresponding to the left eye 10a, and a display unit 12b corresponding to the right eye 10b. Each of the image capturing units 11a and 11b includes an image capturing optical unit 111 and an image capturing element 112. Each of the display units 12a and 12b includes a display element 121 and a display optical unit 122.

The image capturing optical unit 111 causes an optical image of the outside world to be formed on the image capturing element 112. The image capturing element 112 converts light imaged by the image capturing optical unit 111 into an electric signal, thereby capturing a video image. The display element 121 displays a video image captured by the image capturing element 112. The display optical unit 122 causes the video image displayed by the display element 121 to be formed on the eye 10a or 10b of the user.

The display element 121 displays not only the video image captured by the image capturing element 112, but also a video image on which computer graphics (CG) are superimposed. As the display element 121, not only an organic electroluminescent (EL) display, but also a device that requires a light source on the outside of a liquid crystal display, a liquid crystal on silicon (LCOS), or the like can be used. As the display optical unit 122, not only decentered optical unit such as a free-form-surface prism, but also a normal coaxial optical unit, or an optical unit including a zoom mechanism for adjustment to be described below can be used.

The image capturing optical unit 111 can include not only a single-focal-point optical unit, but also a zoom mechanism for adjustment to be described below, or a folding-type optical unit to reduce the dimensions of the entire HMD 2. Additionally, a component such as a mirror or a prism can be used by being placed in front of a lens. As the image capturing element 112, not only a charge-coupled device (CCD) sensor or a complementary metal-oxide semiconductor (CMOS) image sensor that converts visible light into an electric signal, but also an element that converts light other than visible light, such as infrared light, into an electric signal to enhance a user's mixed reality experience can be used.

An angle a-a' is a viewing angle of the left eye 10a of the user. An angle d-d' is a viewing angle of the right eye 10b of the user. The angle a-a' and the angle d-d' are each set to about 150° in a horizontal direction as characteristics of a human viewing angle. An angle a-d' is the binocular viewing angle of both eyes 10a and 10b of the user together. The angle a-d' is set to about 200° in the horizontal direction as characteristics of a human viewing angle. A human has a viewing angle of about 150° in a vertical direction. In the present exemplary embodiment, however, only the viewing angle in the horizontal direction is described, and the description of the viewing angle in the vertical direction is omitted. The case of viewing in the horizontal direction is also applicable to the case of viewing in the vertical direction.

An angle b-b' is formed by lines extending from the pupil of the left eye 10a to each side of the display optical unit 122 of display unit 12a. An angle e-e' is formed by lines extending from the pupil of the right eye 10b to each side of the display optical unit 122 of display unit 12b. The user cannot directly view an object located on the inside of the angle b-b' and the angle e-e'. An area on the inside of the angle b-b' and the angle e-e' is a dead zone for the user. Accordingly, the image capturing units 11a and 11b and the display elements 121 of the display units 12a and 12b are arranged on the inside of the angle b-b' and the angle e-e', respectively. With this configuration, the continuity between the displayed video image and the real field of view can be ensured without shielding an area around the visual field of the user.

An angle c-c' is an image-pickup field angle of the image capturing unit 11a. An angle f-f is an image-pickup field angle of the image capturing unit 11b. In order for the user to continuously view the displayed video image (video-see-through video image) that can be seen from the angle b-b' and the angle e-e' and the real field of view outside the displayed video image, the angle c-c' and the angle f-f need to be greater than or equal to the angle b-b' and the angle e-e', respectively.

A distance "g" represents a width between the eyes 10a and 10b of the user. An average value of the distance "g" between the eyes 10a and 10b of Japanese people is 63 mm. However, since the distance "g" differs from user to user, there is a need to adjust for the distance "g", unlike in the case of an HMD for a single eye. A solution to this issue will be described below.

In a case where the angle b-b' is smaller than the angle a-a' and the angle e-e' is smaller than the angle d-d', the angle a'-b' and the angle d-e are wide. However, this configuration has an adverse effect on viewing with both eyes. For this reason, areas within the angle a'-b' and the angle d-e are preferably shielded.

If relative positions of the display units 12a and 12b are moved in accordance with the distance "g", the angle b-b' and the angle e-e' do not change. In this case, however, it is highly likely that the angles a'-b' and d-e from the pupils of the eyes 10a and 10b, including a positional relationship between the nose of the user and the display units 12a and 12b, may change. Accordingly, there is a need to shield the areas within the angle a'-b' and the angle d-e in accordance with the change.

If such an issue is solved by fixing the display units 12a and 12b regardless of the distance "g", and by increasing the distance of the optical imaging position from the pupils of the eyes 10a and 10b, the angles a'-b' and d-e from the pupils of the eyes 10a and 10b will necessarily change. Accordingly, there is a need to shield the areas within the angle a'-b' and the angle d-e in accordance with the change.

As described above, the relative positions of the display units 12a and 12b may be moved or fixed in accordance with the distance "g". However, the image capturing units 11a and 11b need not necessarily follow the movement of the display units 12a and 12b.

When the image capturing units 11a and 11b are also moved along with the movement of the display units 12a and 12b and are aligned with the optical axis from the pupils of the eyes 10a and 10b, a video image with a minimum sense of discomfort can be presented to the user. However, if the image capturing units 11a and 11b additionally recognize a marker and simultaneously perform an alignment calculation for the HMD 2, the calculation cannot be accurately performed. However, if the distance between the image capturing units 11a and 11b is fixed, there is no need to carry out the calibration that is required every time the distance between the image capturing units 11a and 11b is changed, and thus the alignment calculation can be easily performed.

As described above, when the width "g" between the eyes 10a and 10b differs from user to user, the adjustment of the HMD 2 is required so that the HMD 2 can be used for both eyes. The HMD 2 is required to shield the areas within the angle a'-b' and the angle d-e at the center of viewing with both eyes in accordance with the width "g", and to adjust the distance between the image capturing units 11a and 11b and the distance between the display units 12a and 12b.

Figure 3:
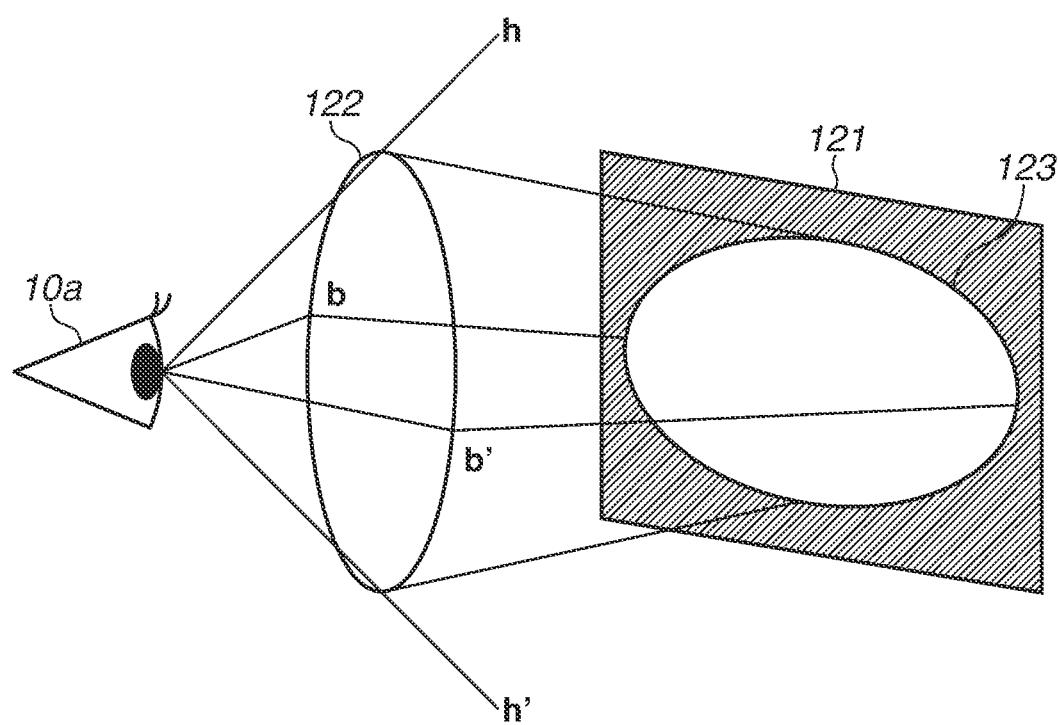
FIG. 3 illustrates a display unit.

FIG. 3 is a schematic diagram illustrating the display unit 12a corresponding to the left eye 10a illustrated in FIG. 2. Unlike in FIG. 2, the left eye 10a is observed laterally in FIG. 3, and an angle h-h' indicates a dead zone in the vertical direction. However, as described above, only the viewing angle in the horizontal direction is described, and thus the description of the viewing angle in the vertical direction is omitted.

The display element 121 displays a video image captured by the image capturing unit 11a. The user can observe the video image displayed by the display element 121 through the display optical unit 122. In this case, the video image displayed on the display element 121 is displayed in an area wider than a valid display area 123 that can be observed by the user. If the video image displayed on the display element 121 is narrower than the valid display area 123, the surface of the display element 121, or the structure within the HMD 2 is visible to the user, so that the continuity between the displayed video image and the real field of view around the visual field is lost.

The display optical unit 122 causes the video image displayed in the valid display area 123 of the display element 121 to be formed on the eyes 10a and 10b of the user so that the user can observe the video image displayed in the valid display area 123. The display element 121 displays the video image in an area wider than the valid display area 123.

The HMD 2 is adjusted in such a manner that the angle c-c' (angle f-f) illustrated in FIG. 2 is greater than or equal to the angle b-b' (angle e-e') and the valid display area 123 matches an area within the angle c-c' (angle f-f). As a result, the displayed video image and the real field of view around the visual field appear to be continuous.

Figure 4:
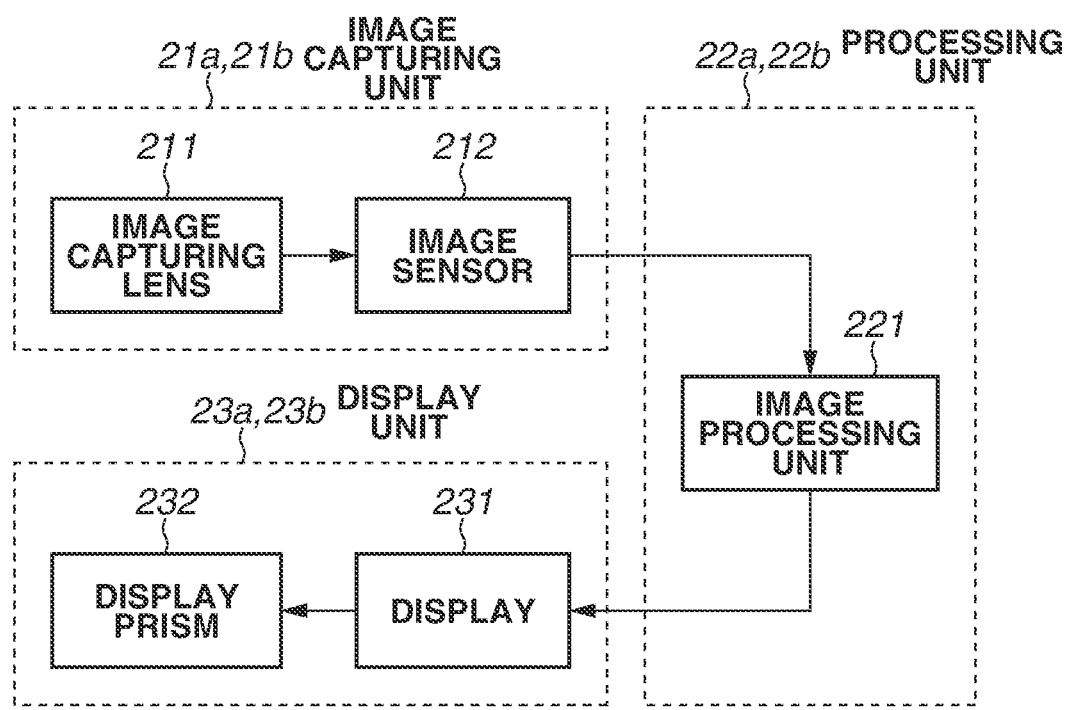
FIG. 4 is a block diagram illustrating a configuration example of the head-mounted display according to the first exemplary embodiment.
Figure 5:
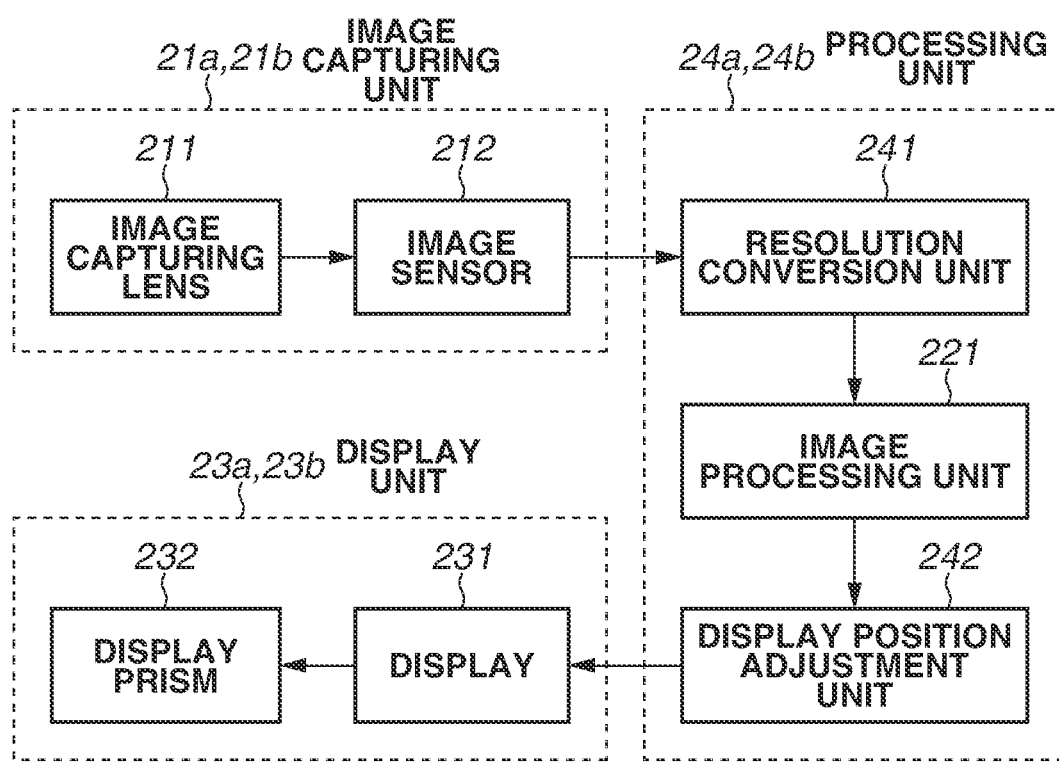
FIG. 5 is a block diagram illustrating a configuration example of the head-mounted display according to the first exemplary embodiment.

The configuration of the HMD 2 and a method and a processing procedure for adjusting a video image to continuously view a captured video image to be displayed and the real field of view around the visual field will be described with reference to FIGS. 4 and 5. FIG. 4 is a block diagram illustrating a configuration example of the HMD 2 that adjusts a video image structurally and optically. The HMD 2 includes a left-eye image capturing unit 21a, a left-eye processing unit 22a, a left-eye display unit 23a, a right-eye image capturing unit 21b, a right-eye processing unit 22b, and a right-eye display unit 23b. The image capturing unit 21a corresponds to the image capturing unit 11a illustrated in FIG. 2, and the image capturing unit 21b corresponds to the image capturing unit 11b illustrated in FIG. 2. The display unit 23a corresponds to the display unit 12a illustrated in FIG. 2, and the display unit 23b corresponds to the display unit 12b illustrated in FIG. 2.

Each of the image capturing units 21a and 21b includes an image capturing lens 211 and an image sensor 212. The image capturing lens 211 is identical to the image capturing optical unit 111 illustrated in FIG. 2, and causes an optical image of the outside world to be formed on the image sensor 212. As the image capturing lens 211, a zoom lens can also be used. In order for the user to continuously view a video image to be displayed and the real field of view around the visual field, the image-pickup field angle of view needs to be greater or equal to the dead zone of the display units 23a and 23b when viewed from the user. The HMD 2 can also be used like a microscope by reducing the image-pickup field angle of the image capturing lens 211. In the present exemplary embodiment, the continuity in the peripheral direction from the center of a video image is mainly described. However, in terms of the continuity of a video image, the continuity with a less sense of discomfort in the depth direction from the user is also required. Accordingly, there is a need to adjust the HMD 2 depending on the characteristics of the eyes of each human, while preventing a depth of field from being extremely shallow.

The image sensor 212 is identical to the image capturing element 112 illustrated in FIG. 2, and converts light imaged by the image capturing lens 211 into an electric signal. As the image sensor 212, not only a CCD sensor or a CMOS image sensor that converts visible light into an electric signal, but also an image sensor that converts infrared light into an electric signal can be used.

Like the image capturing units 11a and 11b illustrated in FIG. 2, the image capturing units 21a and 21b are arranged in the dead zones of the display units 23a and 23b, respectively, when viewed from the user. The image-pickup field angle of each of the image capturing units 21a and 21b is wider than the dead zone of each of the display units 23a and 23b. It is not always necessary to arrange the image capturing units 21a and 21b on the optical axis connecting the user and an observation object. To adjust the HMD 2 structurally and optically in the present exemplary embodiment, the HMD 2 needs to be configured such that the image-pickup field angle of each of the image capturing units 21a and 21b is substantially equal to the display angle of view of each of the display units 23a and 23b, and the image capturing units 21a and 21b corresponding to both eyes are horizontal to the optical axis. There is a phenomenon in which, as the image capturing units 21a and 21b recede from the user, the size of the observation object viewed from the user is different from an actual size of the object. Accordingly, it is important to arrange the image capturing units 21a and 21b at locations as close to the user as possible. With this configuration, the display units 23a and 23b can display a video image so that the user can continuously view with both eyes the video image displayed on the display units 23a and 23b and the real field of view around the visual field.

The processing unit 22a is a processing unit for the left eye and processes the video image captured by the image capturing unit 21a. The processing unit 22b is a processing unit for the right eye and processes the video image captured by the image capturing unit 21b. Each of the processing units 22a and 22b includes an image processing unit 221. The image processing unit 221 performs processing on colors and brightness so that a captured video image can be accurately observed with the eyes of a human, processing for calculating the position of the HMD 2 based on the captured video image, processing for superimposing CG when viewed from the position of the HMD 2 on the captured video image, processing for correcting an image to be displayed, and the like. The image processing unit 221 performs image processing necessary for the HMD 2 using the video see-through method.

The display unit 23a displays the video image processed by the processing unit 22a. The display unit 23b displays the video image processed by the processing unit 22b. Each of the display units 23a and 23b includes a display 231 and a display prism 232.

The display 231 is identical to the display element 121 illustrated in FIG. 2, and displays a video image. The display 231 is an organic EL display, a liquid crystal display, or an LCOS or retina-projection-type projector. The display 231 has a size small enough to be placed in the dead zone for the user, and is arranged in the dead zone for the user.

The display prism 232 is identical to the display optical unit 122 illustrated in FIG. 2, and forms the displayed video image on the pupils of the user. In place of the display prism 232, a normal lens using coaxial and decentered optical units, a Fresnel lens, or a reflecting optical unit such as a mirror can be used.

The display units 23a and 23b are configured in accordance with the width "g" between the eyes 10a and 10b of the user. As described above, the video image to be displayed on the display 231 is wider than a valid angle of view of the display prism 232. To adjust the HMD 2 structurally and optically, the HMD 2 needs to be configured such that the display angle of view of each of the display units 23a and 23b is substantially equal to the image-pickup field angle of each of the image capturing units 21a and 21b, and the display units 23a and 23b are horizontal to the optical axis of the eye in the observation direction. With this configuration, the structural and optical arrangement and the adjustment of the angle of view can be performed so that users with different widths "g" between the eyes can view with both eyes the video image displayed on the display units 23a and 23b and the real field of view around the visual field as continuous.

The method for adjusting a video image structurally and optically has been described above with reference to FIG. 4. Now, a method for electrically adjusting a video image will be described with reference to FIGS. 5 and 6A to 6C. FIG. 5 is a block diagram illustrating a configuration example of the HMD 2 that adjusts a video image electrically. The HMD 2 includes the image capturing units 21a and 21b, processing units 24a and 24b, and the display units 23a and 23b. The HMD 2 illustrated in FIG. 5 has a configuration in which the processing units 24a and 24b are provided instead of the processing units 22a and 22b in the HMD 2 illustrated in FIG. 4. The image capturing units 21a and 21b illustrated in FIG. 5 are identical to the image capturing units 21a and 21b illustrated in FIG. 4. The display units 23a and 23b illustrated in FIG. 5 are identical to the display units 23a and 23b illustrated in FIG. 4.

The processing unit 24a is provided instead of the processing unit 22a illustrated in FIG. 4. The processing unit 24b is provided instead of the processing unit 22b illustrated in FIG. 4. Each of the processing units 24a and 24b include a resolution conversion unit 241 and a display position adjustment unit 242 in addition to the image processing unit 221.

Figure 6A:
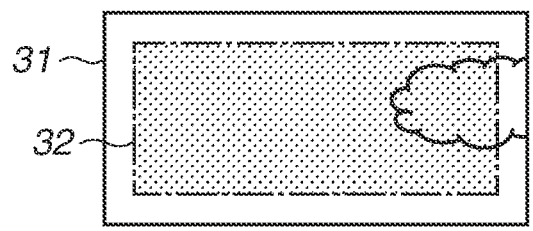
FIGS. 6A, 6B, and 6C each illustrate a video image that is electrically adjusted.

In the case of capturing an image with a wider angle of view by the image capturing lens 211, the resolution conversion unit 241 clips a part of the video image captured by the image sensor 212 and converts the resolution of the clipped video image into a resolution for display, thereby ensuring the continuity between the displayed video image and the real field of view around the visual field. The image capturing units 21a and 21b capture a video image with an area a little wider than the valid display area and the resolution conversion unit 241 clips a part of the video image, thereby making it possible to absorb errors, such as a misalignment in the production process, which occur during the assembly of the image capturing units 21a and 21b. Referring to FIG. 6A, the image capturing units 21a and 21b capture a video image 31 with a little wider angle of view. The resolution conversion unit 241 clips a video image 32 from the captured video image 31.

Figure 6B:
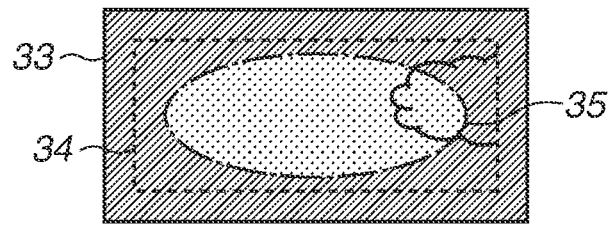

The image processing unit 221 processes the video image whose resolution has been converted by the resolution conversion unit 241. The display position adjustment unit 242 adjusts the display position of the video image processed by the image processing unit 221. As described above, in order to ensure the continuity between the displayed video image and the real field of view around the visual field, while preventing the user from viewing the surface of the display 231 on which no image is displayed and the inside structure, there is a need to set the angle of view of the video image to be displayed on the display 231 to be wider than the valid angle of view of the display prism 232. Errors such as a misalignment in the production process occur during the assembly of the display units 23a and 23b. Accordingly, the errors are adjusted and absorbed by the display position adjustment unit 242. Referring to FIG. 6B, the display position adjustment unit 242 adjusts the display position of a video image 34 in a displayable area 33 of the display 231. The display units 23a and 23b display the video image 34 in the displayable area 33. The video image 34 is displayed with an area wider than a valid display area 35 of the display prism 232.

Figure 6C:
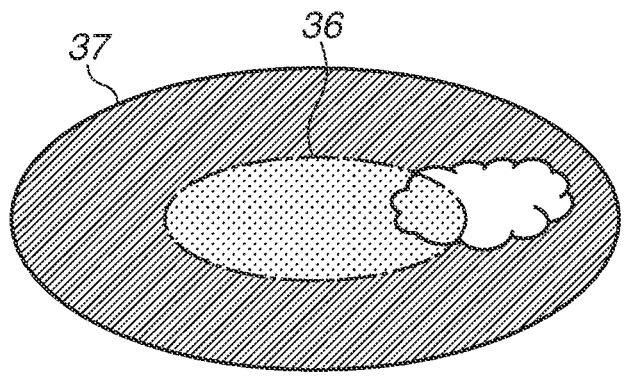

The processing unit 24a and 24b electrically adjust a video image so that the user can continuously view with both eyes the video image displayed on the display units 23a and 23b and the real field of view around the visual field, without the need for uniquely determining the angle of view and the structural and optical arrangement for users with different widths "g" between the eyes. Referring to FIG. 6C, a video image 36 is a video-see-through video image on the HMD 2 when viewed from the user, and is displayed on the display 231 through the display prism 232. The displayed video image 36 and a real field of view 37 of the user can be viewed continuously.

The HMD 2 can, for example, simultaneously acquire a captured video image other than an image for display with a wide angle of view and a clipped video image for display, and thus products with various specifications can be designed. In addition, assembly errors in the production process can be absorbed, and a design margin can be increased. In the configuration illustrated in FIG. 4, the HMD 2 adjusts a video image structurally and optically, and in the configuration illustrated in FIG. 5, the HMD 2 electrically adjusts a video image, thereby ensuring the continuity between the displayed video image and the real field of view around the visual field. The adjustment of the HMD 2 illustrated in FIG. 4 and the adjustment of the HMD 2 illustrated in FIG. 5 can be applied to the design of products in a composite manner.

Figure 7:
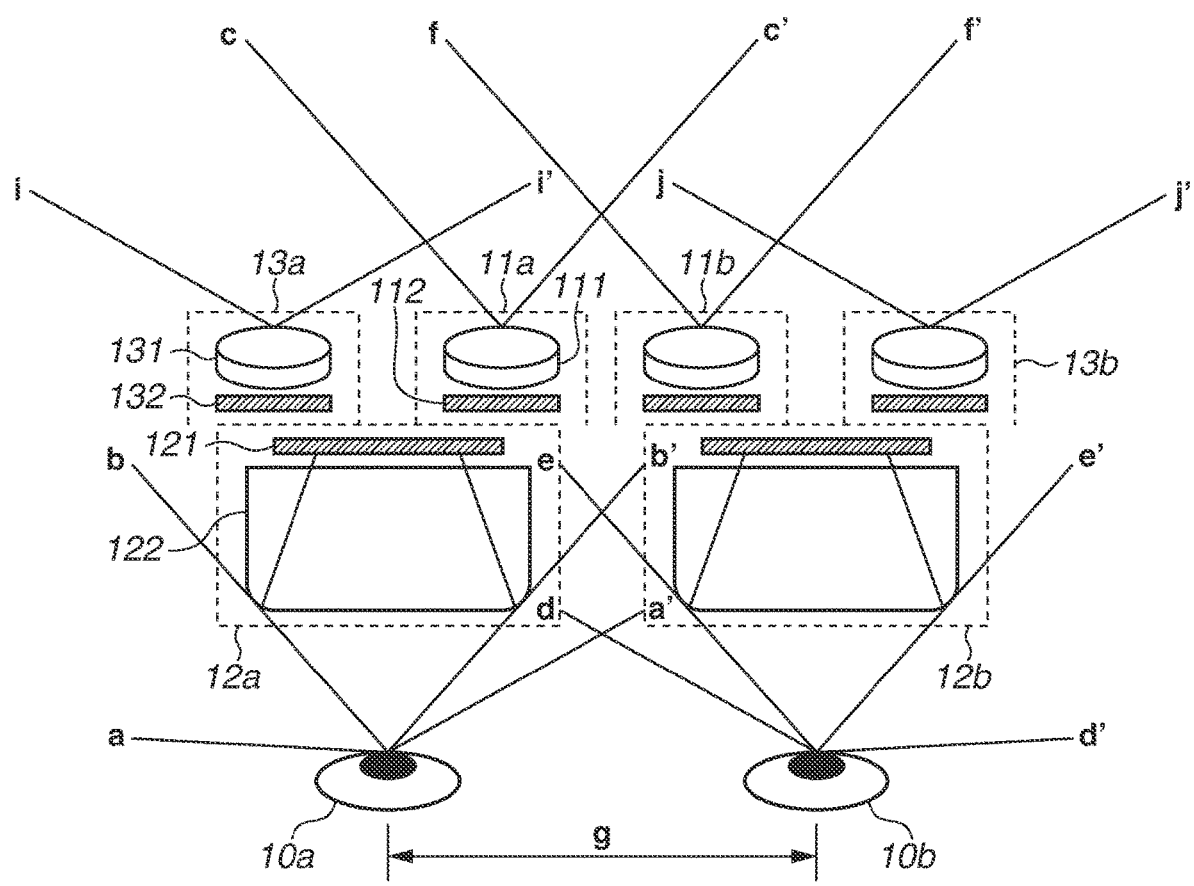
FIG. 7 illustrates a configuration example of a head-mounted display according to a second exemplary embodiment.

FIG. 7 illustrates a configuration example of the HMD 2 according to a second exemplary embodiment of the present disclosure. The HMD 2 illustrated in FIG. 7 has a configuration in which an image capturing unit 13a for the left eye 10a and an image capturing unit 13b for the right eye 10b are provided in the HMD 2 illustrated in FIG. 2. Differences between the first exemplary embodiment and the second exemplary embodiment will be described below. Each of the image capturing units 13a and 13b includes an image capturing optical unit 131 and an image capturing element 132.

The image capturing units 11a and 11b capture video images to be displayed on the display units 12a and 12b, respectively. The image capturing units 13a and 13b capture a video image used for the alignment calculation for the HMD 2, acquire information about a gesture made by the user or about an external environment, and capture a video image other than the video image exclusively used for display.

In the image capturing optical unit 131, there is no need to take into consideration the continuity between the video image displayed on the display units 12a and 12b and the real field of view around the visual field. Accordingly, the image-pickup field angle of the image capturing optical unit 131 is not limited. In the above-described application, the image capturing optical unit 131 preferably has a wider angle of view in many situations. Accordingly, an angle i-i' of the image-pickup field angle of the image capturing unit 13a is greater than the angle c-c' of the image-pickup field angle of the image capturing unit 11a. Similarly, an angle j-j' of the image-pickup field angle of the image capturing unit 13b is greater than the angle f-f' of the image-pickup field angle of the image capturing unit 11b. The angle i-i' and the angle j-j' can be smaller than the angle c-c' and angle f-f', respectively.

As the image capturing element 132, various image capturing elements can be used depending on the intended use of a captured video image. The image capturing element 132 is not only a color or monochromatic image capturing element in a visible light region, but also a stereo camera type or time-of-flight (TOF) type depth sensor.

Like the image capturing units 11a and 11b, it is important to arrange the image capturing units 13a and 13b in the dead zones of the display units 12a and 12b, respectively, when viewed from the user, so that the continuity between the displayed video image and the real field of view around the visual field can be ensured. Alternatively, three or more image capturing units can be provided in the dead zone of each of the two display units 12a and 12b.

Figure 8:
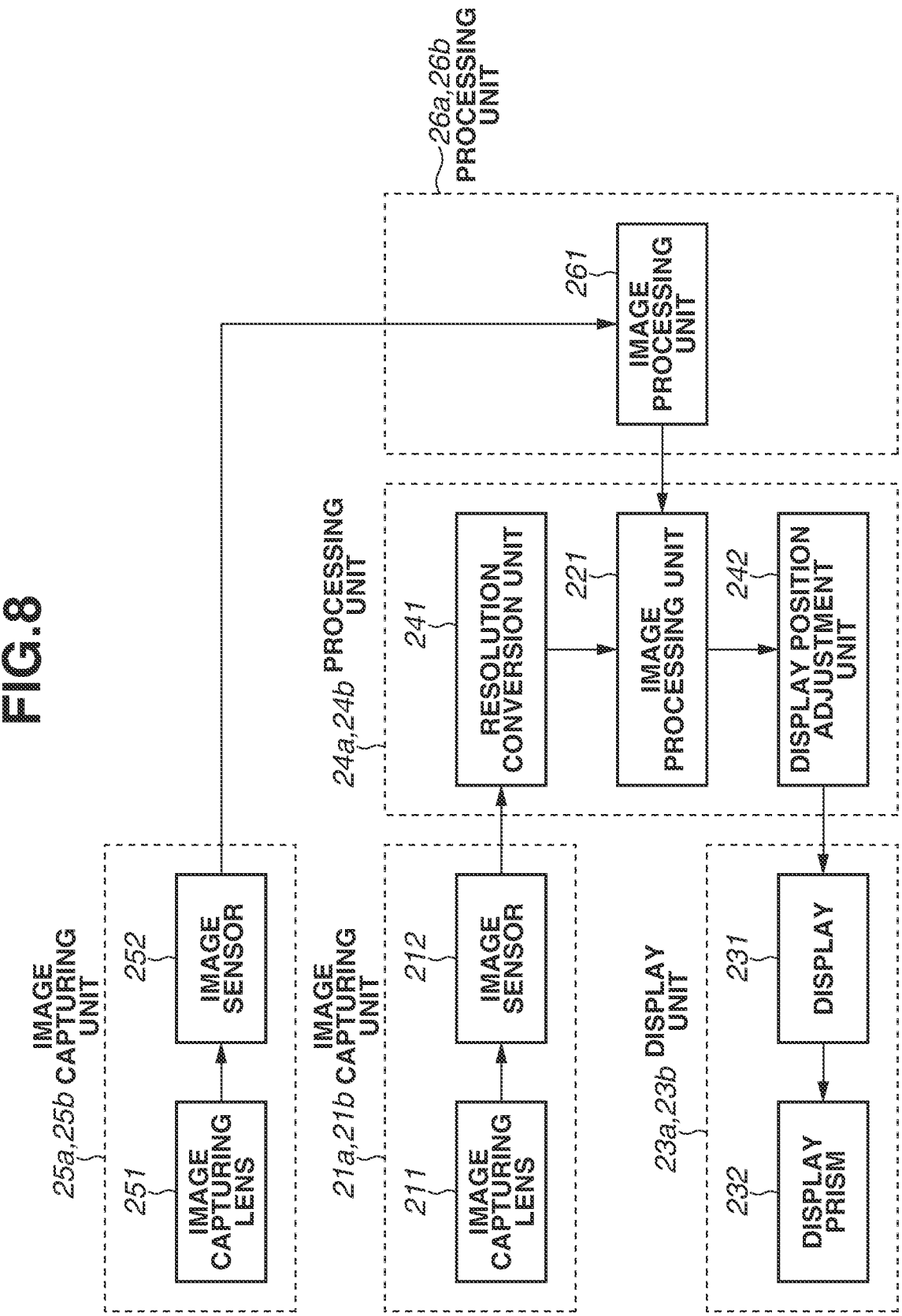
FIG. 8 is a block diagram illustrating a configuration example of the head-mounted display according to the second exemplary embodiment.

FIG. 8 is a block diagram illustrating a configuration example of the HMD 2 according to the second exemplary embodiment. The HMD 2 illustrated in FIG. 8 has a configuration in which image capturing units 25a and 25b and processing units 26a and 26b are added to the HMD 2 illustrated in FIG. 5. The image capturing units 21a and 21b, the display units 23a and 23b, and the processing units 24a and 24b illustrated in FIG. 8 are identical to those illustrated in FIG. 5.

The image capturing unit 25a corresponds to the image capturing unit 13a illustrated in FIG. 7. The image capturing unit 25b corresponds to the image capturing unit 13b illustrated in FIG. 7. Each of the image capturing unit 25a and 25b includes an image capturing lens 251 and an image sensor 252.

The image capturing lens 251 is identical to the image capturing optical unit 131 illustrated in FIG. 7, and causes an optical image of the outside world to be formed on the image sensor 212. The image-pickup field angle of the image capturing lens 251 is determined depending on the intended use of a captured video image, and is not limited by the other components of the HMD 2.

The image sensor 252 is identical to the image capturing element 132 illustrated in FIG. 7. The image sensor 252 converts light imaged on the image capturing lens 251 into an electric signal, thereby capturing a video image. The angle of view of the image sensor 252 is determined depending on the intended use of a captured video image, and the input of the image sensor 252 is not limited to visible light.

The processing unit 26a processes a video image captured by the image capturing unit 25a. The processing unit 26b processes a video image captured by the image capturing unit 25b. Each of the processing unit 26a and 26b includes an image processing unit 261. The image processing unit 261 performs image processing depending on the intended use, such as the alignment calculation for the HMD 2, analysis of a gesture, or feedback to the HMD 2 using information about the external environment. The image processing unit 221 processes information output from the image processing unit 261 and feeds back the information from the image processing unit 261 to the video image on the HMD 2.

Figure 9:
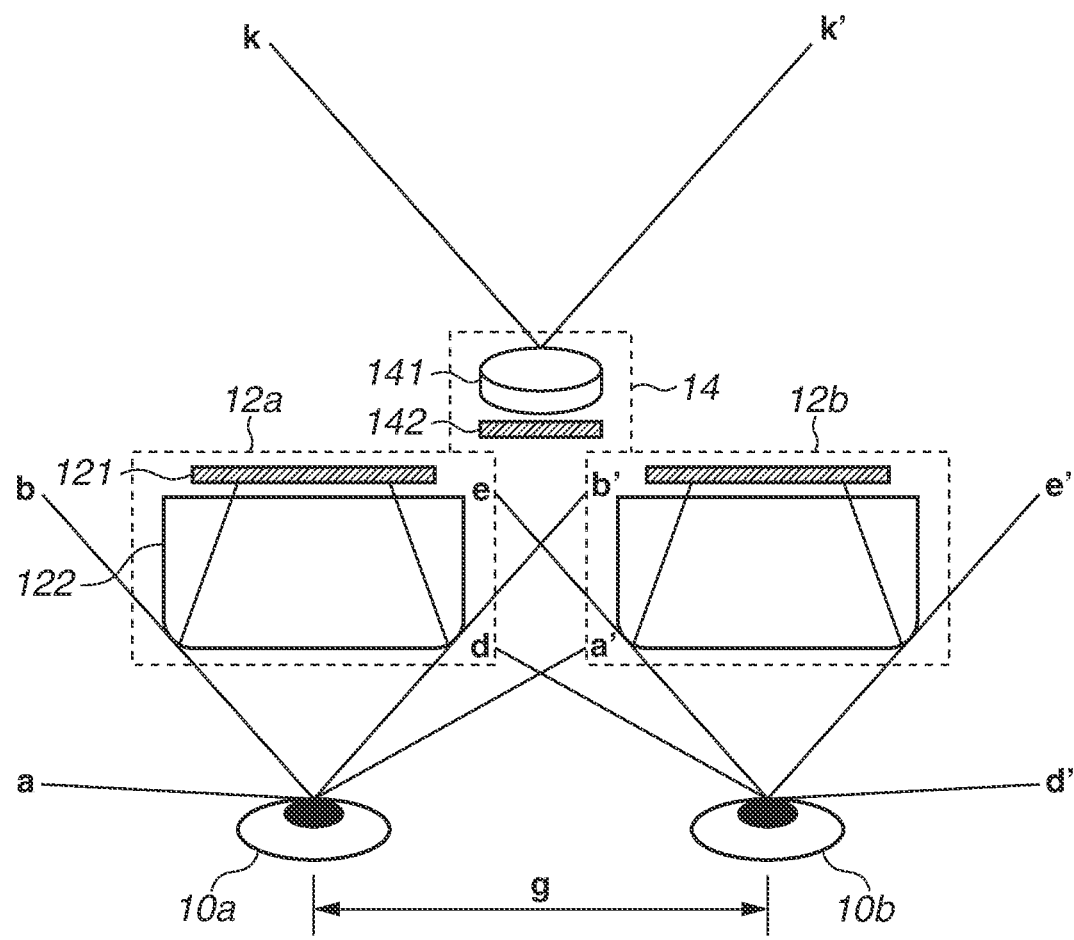
FIG. 9 illustrates a configuration example of a head-mounted display according to a third exemplary embodiment.

FIG. 9 illustrates a configuration example of the HMD 2 according to a third exemplary embodiment of the present disclosure. The HMD 2 illustrated in FIG. 9 has a configuration in which a monocular image capturing unit 14 is provided instead of the image capturing units 11a and 11b for both eyes in the HMD 2 illustrated in FIG. 2. The display units 12a and 12b illustrated in FIG. 9 are identical to the display units 12a and 12b illustrated in FIG. 2. Differences between the first exemplary embodiment and the third exemplary embodiment will be described below. The image capturing unit 14 includes an image capturing optical unit 141 and an image capturing element 142, and captures a video image. The image capturing optical unit 141 is similar to the image capturing optical unit 111 illustrated in FIG. 2. The image capturing element 142 is similar to the image capturing element 112 illustrated in FIG. 2.

The display units 12a and 12b display a video image captured by the image capturing unit 14. Accordingly, it is difficult for the HMD 2 to provide a stereoscopic view. However, the configuration of the HMD 2 is a minimum configuration for the video see-through HMD in which the display units 12a and 12b for both eyes are provided.

The image capturing unit 14 captures an image in the range of an angle k-k'. The resolution conversion unit 241 illustrated in FIG. 5 can clip a video image as described above. In this case, the angle k-k' of the image-pickup field angle of the image capturing unit 14 needs to be greater than or equal to the angle b-b' and the angle e-e'. The image capturing unit 14 can separate a captured video image for display from a captured video image used for an application other than display with a wide angle of view. Like in the first and second exemplary embodiments, various image capturing elements can be used as the image capturing element 142 depending on the intended use of a captured video image. In order to ensure the continuity between the displayed video image and the real field view in the area around the visual field, it is important to arrange the image capturing unit 14 in the dead zone of the display unit 12 when viewed from the user. The configuration of the HMD 2 and processing for adjusting a video image according to the third exemplary embodiment are similar to those illustrated in FIGS. 4 and 5 according to the first exemplary embodiment.

According to the first to third exemplary embodiments, the HMD 2 has a configuration in which the image capturing units are arranged in the dead zones of the display units for both eyes, respectively, when viewed from the user, and the HMD 2 is provided with an exterior package configured such that a large structure is not located on the outside of the dead zones. With this configuration, it is possible to provide the HMD 2 with less dead zones other than the real field of view around the visual field and the display units when viewed from the user. In addition, the HMD 2 adjusts a video image structurally and optically as illustrated in FIG. 4, or adjusts a video image electrically as illustrated in FIG. 5, thereby making it possible to continuously view a video-see-through video image displayed on the display units and the real field of view around the visual field.

A narrow image-pickup field angle of each image capturing unit and a narrow display angle of view of each display unit in the HMD 2 using the video see-through method indicate that the visual field of the user is narrow, and thus are not preferable as specifications of a product in terms of safety. In the first to third exemplary embodiments, a narrow angle of view indicates that only the area of a video image to be displayed by the display units is narrow, while the user's field of view can be ensured. Accordingly, the HMD 2 of various specifications can be implemented as a product.

Further, the HMD 2 can enhance the user's mixed reality experience by achieving the continuity between the real field of view and a displayed video image, which is one of the advantages of an optical see-through HMD, and can prevent a reduction in the effect of mixed reality due to see-through CG, which is an issue inherent in the optical see-through HMD. Consequently, a comprehensive enhancement of the user's mixed reality experience can be achieved. In addition, immersive fully-virtual and video see-through HMDs are configured such that the area around the visual field is not shielded and is visible, which leads to a great reduction in video motion sickness which is an issue inherent in such HMDs.

While the exemplary embodiments described above illustrate the HMD as an example of the display apparatus, a display apparatus having other configurations, such as a hand-held display (HHD), is also applicable.

The exemplary embodiments described above are merely specific examples for implementing the present disclosure, and the technical scope of the present disclosure should not be interpreted in a limitative manner by the exemplary embodiments. That is, the present disclosure can be carried out in various forms without departing from the technical scope or the main features of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-006487, filed Jan. 18, 2018, which is hereby incorporated by reference herein in its entirety.

What is claimed is:

1. A display apparatus including a left portion corresponding to a left eye of a user and a right portion corresponding to a right eye of the user, each portion comprising:
at least one image capturing unit configured to capture a video image of a physical space, the captured video image is larger than a valid display area which can be observed by the user;
a resolution conversion unit configured to clip out a part of the captured video image and convert a resolution of the clipped part of the captured video image into a resolution for display to obtain a converted video image, the resolution conversion unit reducing an error occurred in capturing the video image by clipping out the captured video image which is larger than the valid display area;
an image processing unit configured to generate a processed video image by superimposing a virtual image on the converted video image;
a position adjustment unit configured to adjust a display position of the processed video image for reducing an error to be occurred in displaying the processed video image and output an adjusted video image; and
a display unit configured to display the adjusted video image in an area which is larger than the valid display area, with allowing the user to see a real image directly through outside of the display unit, and enable the user to view the adjusted video image as an image continued from the real image outside of the display unit,
wherein the image capturing unit is arranged on an inside of an angle formed by two tangent lines extending from the pupil of the corresponding eye to contact at left and right sides of the display unit, respectively, and an image-pickup field angle of the image capturing unit is greater than or equal to the angle formed by the two tangent lines.

2. The display apparatus according to claim 1,
wherein the image capturing unit includes an image capturing element, and an image capturing optical unit configured to form an optical image on the image capturing element, and
wherein the display unit includes a display element configured to display the adjusted video image, and a display optical unit configured to form the adjusted video image displayed by the display unit on the corresponding eye of the user.

3. The display apparatus according to claim 2, wherein a structural and optical arrangement of the portions and an adjustment of an angle of view are performed to enable the user to view with both eyes the adjusted video image displayed by the display units and the real field of view around the visual field, as continuous.

4. The display apparatus according to claim 3, wherein the structural and optical arrangement of the portions and an adjustment of an angle of view are performed to compensate for different widths between the eyes of individual users.

5. The display apparatus according to claim 2,
wherein the display optical unit causes a video image displayed in a valid display area of the display element to be formed on the corresponding eye of the user to enable the user to observe the video image in the valid display area, and
wherein the display element displays the video image in an area wider than the valid display area.

6. The display apparatus according to claim 1, wherein the image-pickup field angle of the image capturing unit and a display angle of view of the display unit are substantially equal.

7. The display apparatus according to claim 1, wherein the resolution conversion unit and the display position adjustment unit are configured to perform processing to compensate for different widths between the eyes of individual users.

8. The display apparatus according to claim 1, wherein the display apparatus is a head-mounted display.

9. The display apparatus according to claim 8, further comprising a holding unit configured to hold a positional relationship between a head of the user and the display apparatus.

10. The display apparatus according to claim 1, wherein the display unit includes at least two display units.

11. The display apparatus according to claim 10, wherein the image capturing unit includes at least two image capturing units respectively corresponding to the at least two display units.

12. The display apparatus according to claim 1, wherein the virtual image is generated by an external apparatus.

13. The display apparatus according to claim 1, wherein the display unit has a shape that enables the user to view the physical space.

14. The display apparatus according to claim 13, wherein, in a case where the user views the physical space, the image capturing unit is arranged at a position where the physical space is not viewed by the user.

15. The display apparatus according to claim 1, wherein the video image based on the captured image obtained by the image capturing unit is a moving image.

16. The display apparatus according to claim 1, wherein the display units each include a zoom function.

* * * * *